(No Model.) 3 Sheets—Sheet 3.
R. NERRLICH.
PHOTOGRAPHIC SHUTTER.
No. 564,216. Patented July 21, 1896.
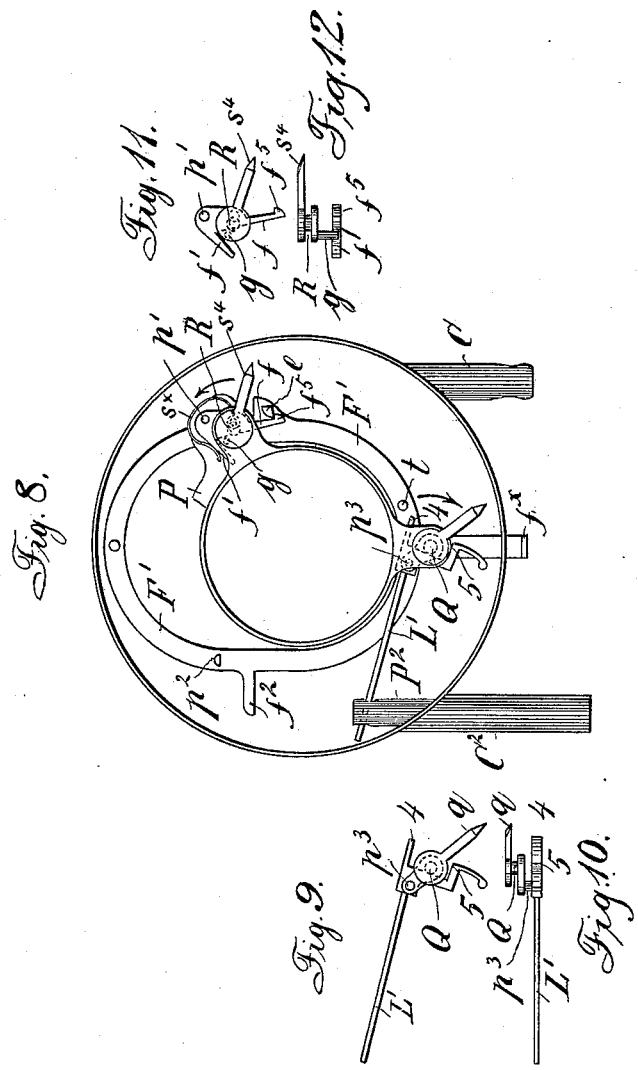
Witnesses:
Inventor
Richard Nerrlich

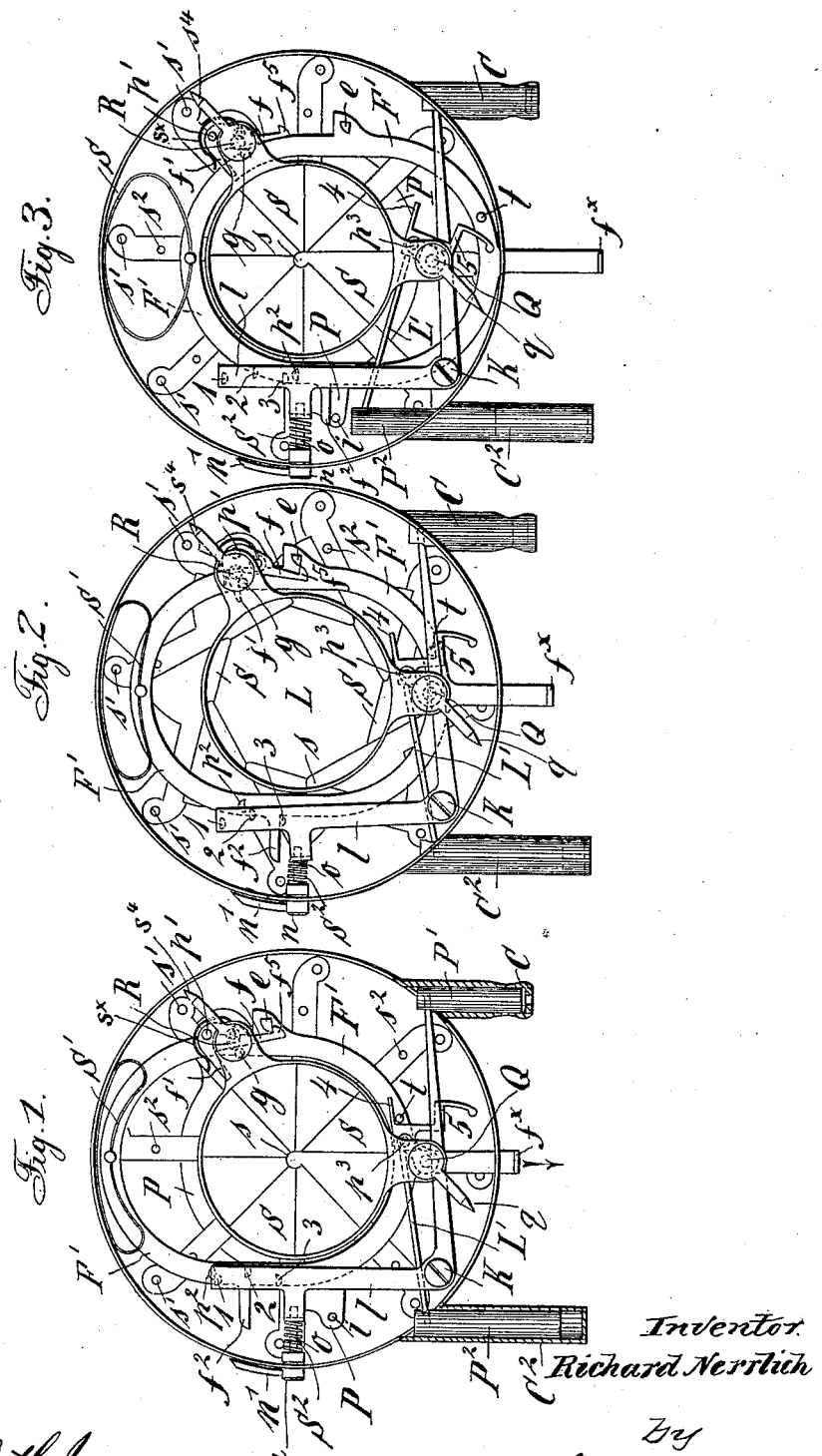

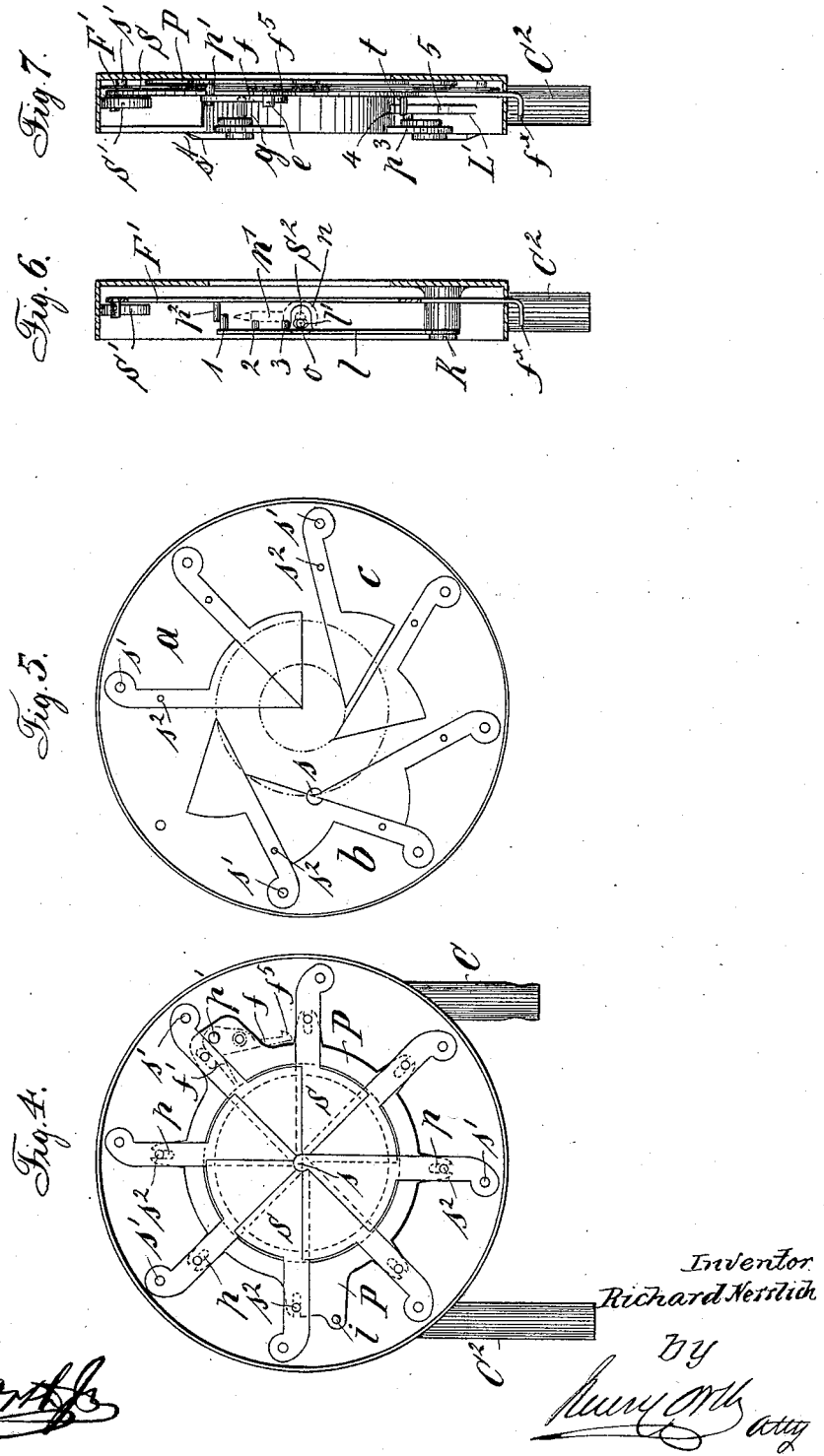

UNITED STATES PATENT OFFICE.

RICHARD NERRLICH, OF BERLIN, GERMANY, ASSIGNOR TO CARL PAUL GOERZ, OF SCHÖNEBERG, GERMANY.

PHOTOGRAPHIC SHUTTER.

SPECIFICATION forming part of Letters Patent No. 564,216, dated July 21, 1896.

Application filed November 22, 1894. Serial No. 529,575. (No model.)

*To all whom it may concern:*

Be it known that I, RICHARD NERRLICH, a subject of the German Emperor, residing at 19 Zehdenickerstrasse, Berlin, Germany, have invented certain new and useful Improvements in and Relating to Shutters for Photographic Cameras; and I do hereby declare the following to be a clear and exact description of the invention.

My invention has relation to photographic cameras, and more particularly to the shutters for such and the means for operating the same.

The object of my invention is to so construct the camera-shutter as to adapt the same for use as an instantaneous as well as a time shutter by combining a series of sectors, so that a central opening of a greater or less diameter will be formed when said sectors are revolved about their axes to a greater or less degree, and said central opening closed when the sectors are moved back to a normal position, the axes of rotation of the sectors being arranged in a circle, preferably in the same plane, in order that the shutter may also be interposed between two lenses or sets of lenses of compound objectives, the shutters being made of very thin sheet metal.

In the accompanying drawings, Figures 1, 2, and 3 are sectional face views of a camera-shutter embodying my invention and illustrating the operative devices in their various positions. Fig. 4 is a like view illustrating more clearly the arrangement of the shutter-sectors relatively to their actuating-ring. Fig. 5 is a fragmentary elevation illustrating the various positions assumed by the shutter elements or sectors in opening and closing. Figs. 6 and 7 are left and right hand sectional side elevations of Fig. 1, part of the mechanism being omitted in Fig. 6. Fig. 8 is also a sectional face view showing a portion of the operative mechanism, and Figs. 9 to 12 are detail views.

As above stated, the shutter is constructed of a series of sectors S of a uniform shape, which when the shutter is closed lie against one another and form a plain disk that covers the light-aperture or lens, as shown at $a$, Fig. 5, said sectors having the same relation to each other when positioned to form a polygonal opening, as shown at $b$, while in all the intermediate positions of the sectors their lateral edges are parallel with one another, as shown at $c$ in said Fig. 5.

The sectors may be constructed so that their edges will lie in contact when said sectors are in their closed position. It is, however, difficult to obtain in this manner a shutter that is impenetrable to light, by reason of the difficulty in obtaining a perfect joint along the sector edges. To avoid this, I so arrange the shutter-sections that their edges will overlap one another, as shown in dotted lines in Fig. 4, and I provide the upper, or both the upper and lower, i. e., the initial, or the initial and terminal sectors of the series with a disk $s$, Figs. 1, 3, and 4, at their apices, so as to contain between them the apices of all the other sectors when in their closed position, said disks covering the meeting-point of the said apices.

Referring now to Figs. 1 to 12, S S indicate the sector-plates having their pivots $s'$ in a circle and in the same plane, the shank of each of said sectors being provided with a pin $s^2$, that projects into a radial slot $p$, formed in a revoluble ring-shaped actuating-plate P, encompassing the lens or light-aperture L. When the sectors S are in their normal position $a$, Figs. 1 and 5, and the actuating-ring P is revolved to a certain extent in the proper direction, the sectors S will also be revolved on their pivots $s'$ to move away from their common meeting-point, whereby a polygonal opening will be formed, bounded by a portion of one side of the shutter elements, (sectors S,) which opening will again be closed when ring P is turned back to its starting-point, thereby returning the shutter elements S back into their normal position $a$. The ring P is revolved by a vertically-movable slide F', of suitable form, as, for instance, of the form of a substantially elliptical frame, said slide being moved automatically in a downward direction by a spring S', Figs. 1, 2, and 3.

On a laterally-projecting arm of the slide F' is secured an abutment $e$ normally in engagement with a hook $f^5$ on the end of the vertical arm of a bell-crank lever $f$, pivoted at $p'$ to the actuating-ring plate P, (more clearly shown in Figs. 4, 7, 8, 11, and 12,) means being provided to lock slide F′ into a normal position, as hereinafter described. If the said slide is released, it is moved downward under the stress of its spring S′, thereby revolving the actuating-ring P, through the medium of the bell-crank lever $f$ and abutment $e$, until the horizontal arm $f'$ of said lever contacts with a pin $g$, whereby said lever $f$ is disengaged from abutment $e$. The pin $g$ above referred to is arranged eccentrically on a disk carried by a stud R, revoluble in a suitable bearing in the shutter-housing, said stud R also carrying an index-arm $s^4$, (see more particularly Figs. 7, 8, 11, and 12,) whereby said pin $g$ can be adjusted in, or substantially in, the plane of motion of the slide F′, so that by proper adjustment of pin $g$ the lever $f$ will be disengaged sooner or later from abutment $e$ for the purpose of varying the diameter of the shutter-opening. As soon as the lever $f$ moves out of engagement with its abutment $e$ the rotary movement of the ring P ceases holding the shutter-sections S in their open position, Fig. 2, the diameter of the opening depending upon the position of the pin $g$ relatively to arm $f'$ of lever $f$, as above stated, or, in other words, upon the amplitude of rotation of ring P. As the slide F′ continues its downward movement an arm $f^2$ thereon on the side opposite to that of abutment $e$, Figs. 1 to 3 and Fig. 8, comes in contact with a pin $i$ on ring P, revolving the latter in a reverse direction, thereby moving the shutter-sections back to their normal position, Fig. 3, and closing the shutter-opening. When the slide F′ is pushed back to its normal position by means of the handle $f^×$ for the purpose of bringing the spring S′ under tension again, Fig. 1, the abutment $e$ will slide over the inclined face of the hook $f^5$ of lever $f$ and push the same out of the way, so that the ring P will not be revolved by the contact of said abutment with the lever-hook, the shutter remaining closed.

In practice the lever $f$ is held in a normal position by means of a spring $s^×$, Figs. 1, 3, and 8, or the arm $f'$ of said lever may be weighted to hold the hook $f^5$ thereof in the path of abutment $e$.

The slide F′ is locked into position and released through the medium of a bell-crank lever $l$, the vertical arm of which is provided with prism-shaped abutments 1, 2, and 3, (more clearly shown in Fig. 6,) said lever being controlled by a piston P′, working in a cylinder C. On the other hand, the vertical arm of the said bell-crank lever $l$ can be adjusted toward and from the slide F′ by means of a pin $o$, secured eccentrically to a turn-button $n$, provided with a radial arm $n'$ and working in a slot $l'$, formed in a projection on the vertical arm of said lever, (see Fig. 6,) according as the shutter is employed for instantaneous or time exposure.

When the shutter-operating devices are in their normal or operative position, a pin $p^2$ on the slide F′ bears on the abutment 1 of lever $l$, whereby said slide is held against motion under the stress of its spring S′. If the piston P′ is now moved upwardly by air-pressure in a well-known manner, the lever $l$, connected therewith through its horizontal arm, will be moved in such manner that the abutment 1 on its vertical arm will move from under the pin $p^2$ and release slide F′, which latter is then moved downward by its spring S′. The abutments 2 and 3 on lever $l$ are shorter than the abutment 1, (see Fig. 6,) so that the pin $p^2$ can pass by them when slide F′ moves down when the said lever $l$ has been adjusted by the means above described at a sufficient distance from said slide, which latter can thus move to its extreme downward position. When, however, the lever $l$ is adjusted closer to the slide F′, the abutments 2 and 3 will lie in the path of pin $p^2$, so that the downward movement of said slide F′ will be stopped by abutment 2, at which time the ring P will have moved the sectors S sufficiently to form the light-aperture, and said ring P will remain stationary, since the hook $f^5$ on lever $f$ will then be out of engagement with abutment $e$ on the ring. As soon as the pressure upon piston P′ ceases the spring $S^2$ will return the lever $l$, and therethrough the said piston, to their normal positions, abutment 2 on said lever moving from under pin $p^2$ on slide F′, said pin coming in contact with abutment 3. During this movement of the slide F′ the ring P is still out of engagement with said slide, the shutter therefore remaining open; but if the piston P′ is again moved upward to move the lever-abutment 3 from under the pin $p^2$ on slide F′ the latter will be free to move to its lowermost position, thereby closing the shutter-aperture by the contact of the slide projection $f^2$ with the stop-pin $i$, as above described. On the other hand, whenever the lever $l$ is rapidly moved back to its normal position the pin $p^2$ on slide F′, instead of dropping from abutment 1 onto abutment 2 of said lever, will pass by the abutment 2 and drop onto abutment 3, so that the time during which the shutter remains open can be varied.

For instantaneous exposures a single upward movement of the piston is therefore necessary to release the slide F′ and open the shutter, while for time exposures two such movements of the said piston are required, the first for opening and the second for closing the shutter.

In instantaneous photography the time of exposure can be varied by retarding the movement of the slide F′ during the time the shutter is open, that is to say, during the time the ring P is disconnected from said slide, and this I accomplish by means of a horizontal lever L′, fulcrumed on a pin $p^3$. The lever L′ is connected with a piston $P^2$, working in a cylinder $C^2$, and is adapted to be adjusted in a substantially horizontal plane. To this end the said lever L′ is secured to a fulcrum $p^3$, arranged eccentrically on a disk secured to a pin or stud Q, that has its bearing in the shutter-housing, and carries an arm $q$, by means of which the stud is revolved and the lever L' adjusted. (See Figs. 1 to 3, Fig. 8, and detail Figs. 9 and 10.)

It will readily be seen that when the lever L' is adjusted to its extreme right-hand position, as shown in Fig. 8, the pin $t$ will move clear of the abutments 4 and 5; but if said lever is adjusted toward the left, so that said pin will lie between the abutments 4 and 5, Fig. 1, it, the pin, will come in contact with abutment 5, Fig. 2, when slide F' moves downward after the shutter has been opened, thereby tilting the lever so that it will lift piston $P^2$ until said pin $t$ moves out of contact with the abutment during the further downward movement of slide F', whereby said downward movement, and consequently the closure of the shutter Fig. 3, is retarded. Hence, the extent of upward movement of the piston $P^2$, and consequently the time during which the downward movement of the slide F' is retarded, is determined by the position of lever L'. When slide F' is returned to its normal position, Fig. 1, the pin $t$ contacts with the abutment or arm 4 of lever L', thereby returning piston $P^2$ to its normal position.

Having thus described my invention, what I claim as new therein, and desire to secure by Letters Patent, is—

1. The combination with a camera-shutter comprising a disk composed of sectors having proximate straight edges, said sectors revoluble in a common plane on independent pivots arranged in a circle, and an actuating device adapted to revolve the sectors synchronously in opposite directions, of a slide adapted to impart motion in opposite directions to said actuating device at the beginning and ending of the movement of said slide respectively, said actuating device remaining stationary during the intermediate period of motion of the slide, for the purpose set forth.

2. The combination with a camera-shutter comprising a disk composed of sectors revoluble on independent pivots, and an actuating device adapted to move the sectors synchronously in one or the other direction; of a slide adapted to impart motion in opposite directions to said actuating device at the beginning and ending of the movement of said slide respectively, said actuating device remaining stationary during the intermediate period of motion of the slide, and means for retarding the movement of the slide during said intermediate period of motion, for the purpose set forth.

3. The combination with a camera-shutter comprising a disk composed of sectors revoluble on independent pivots, and an actuating device adapted to move the sectors synchronously in one or the other direction; of a movable slide adapted to impart motion in opposite directions to said actuating device at the beginning and ending of the movement of said slide respectively, said actuating device remaining stationary during the intermediate period of motion of the slide and means for arresting the movement of the slide before the completion of its motion, for the purpose set forth.

4. The combination with a camera-shutter consisting of a disk composed of sectors revoluble on independent pivots, and an actuating device adapted to move said sectors synchronously in one or the other direction; of a slide, a connection between the same and the actuating device adapted to impart motion to the latter to move the sectors in one direction, means for disconnecting the slide from the actuating device before said slide reaches the limit of its movement, and means for again connecting the slide with the actuating device to move the sectors in an opposite direction when said slide is about to reach the limit of its said movement, for the purpose set forth.

5. The combination with the sectors S, the ring P, connected thereto, and the bell-crank lever $f$ on said ring, of the spring-actuated slide F' and the abutment $g$ in the path of the horizontal arm of the aforesaid bell-crank lever, substantially as and for the purpose set forth.

6. The combination with the slide F' having abutment $p^2$, of a bell-crank lever provided with an abutment 1, substantially as and for the purpose set forth.

7. The combination with the slide F' having abutment $p^2$, of the bell-crank lever $l$ having abutments 1, 2, 3, in different planes, said abutments 2, 3, shorter than abutment 1, and means for adjusting the lever toward and from the slide, substantially as and for the purpose set forth.

8. The combination with the slide F' having pin $t$, of the weighted lever L' provided with abutments 4, 5, respectively, substantially as and for the purpose set forth.

9. The combination with the slide F' having pin $t$, of the weighted lever L' provided with abutments 4 and 5, and means for moving said abutments into or out of the path of said pin $t$, for the purpose set forth.

10. The combination with the slide F' having pin $t$, of the weighted lever L' provided with abutments 4, 5, respectively, said lever adjustable relatively to the pin $t$ in a plane at right angles to the plane of motion of the pin, substantially as and for the purpose set forth.

In testimony that I claim the foregoing as my invention I have hereto signed my name in presence of two witnesses.

RICHARD NERRLICH.

Witnesses:
RICHARD SCHMIDT,
WM. HAUPT.